US009348166B2

(12) United States Patent
Pang et al.

(10) Patent No.: US 9,348,166 B2
(45) Date of Patent: May 24, 2016

(54) LIQUID CRYSTAL DISPLAY PANEL

(71) Applicants: BOE Technology Group Co., Ltd., Beijing (CN); Beijing BOE Display Technology Co., Ltd., Beijing (CN)

(72) Inventors: Libin Pang, Beijing (CN); Dongki Oh, Beijing (CN); Xuesong Gao, Beijing (CN)

(73) Assignees: BOE Technology Group Co., Ltd., Beijing (CN); Beijing BOE Display Technology Co., Ltd., Beijing (CN)

( * ) Notice: Subject to any disclaimer, the term of this patent is extended or adjusted under 35 U.S.C. 154(b) by 0 days.

(21) Appl. No.: 14/337,462

(22) Filed: Jul. 22, 2014

(65) Prior Publication Data
US 2015/0253605 A1    Sep. 10, 2015

(30) Foreign Application Priority Data

Mar. 6, 2014    (CN) .......................... 2014 1 0081048

(51) Int. Cl.
G02F 1/1333    (2006.01)
G06F 3/041    (2006.01)
G06F 3/044    (2006.01)
G02F 1/1343    (2006.01)

(52) U.S. Cl.
CPC ............ *G02F 1/13338* (2013.01); *G06F 3/044* (2013.01); *G06F 3/0412* (2013.01); *G02F 2001/134318* (2013.01)

(58) Field of Classification Search
CPC ..... G02F 1/13338; G06F 3/041; G06F 3/044; G06F 3/0412
See application file for complete search history.

(56) References Cited

U.S. PATENT DOCUMENTS

| 2003/0071958 | A1* | 4/2003 | Wu | .................... G02F 1/133377 349/156 |
| 2009/0256820 | A1* | 10/2009 | Yanase | ................... G06F 3/0412 345/174 |
| 2010/0149128 | A1 | 6/2010 | No et al. | |
| 2010/0295824 | A1* | 11/2010 | Noguchi | ............. G02F 1/13338 345/175 |
| 2011/0181576 | A1 | 7/2011 | Pan et al. | |
| 2014/0118297 | A1* | 5/2014 | Huang | ..................... G06F 3/044 345/174 |
| 2014/0267947 | A1* | 9/2014 | Yeh | ...................... G06F 3/03547 349/12 |
| 2015/0070303 | A1 | 3/2015 | Zhao | |
| 2015/0245806 | A1* | 9/2015 | Kim | ....................... A61B 6/542 378/37 |

FOREIGN PATENT DOCUMENTS

CN    103186308 A    7/2013

* cited by examiner

*Primary Examiner* — James Dudek
(74) *Attorney, Agent, or Firm* — Westman, Champlin & Koehler, P.A.

(57) ABSTRACT

The present disclosure provides a liquid crystal display panel. The liquid crystal display panel comprises an array substrate and a color filter substrate. Liquid crystal is filled between the array substrate and the color filter substrate, the array substrate includes a pixel electrode, and the color filter substrate includes a common electrode corresponding to the pixel electrode. The common electrode stores charges when an external object carrying static electricity touches a display region of the liquid crystal display panel, and thus a potential difference is formed between the pixel electrode of the array substrate and respective touch points, contacting with the external object, in the display region of the liquid crystal display panel, so that the liquid crystal between the touch point and the pixel electrode is deflected according to the formed potential difference. With such liquid crystal display panel, a process for displaying dynamically depicted graphs is simplified.

11 Claims, 3 Drawing Sheets

LIQUID CRYSTAL DISPLAY PANEL

CROSS-REFERENCE TO RELATED APPLICATION

This application claims the benefit of Chinese Patent Application No. 201410081048.X filed on Mar. 6, 2014 in the State Intellectual Property Office of China, the whole disclosure of which is incorporated herein by reference.

BACKGROUND OF TILE INVENTION

1. Field of the Invention

Embodiments of the present invention relates to the technical field of liquid crystal display, and more particular, to a liquid crystal display panel.

2. Description of the Related Art

With the rapid development and application of information technology, wireless mobile communication and information appliances, in order to achieve a lighter and more portable demonstration board that can be operated more humanizedly, the demonstration board is changed from a conventional whiteboard, with a carbon pen being used for writing, into a liquid crystal display panel having a demonstration function.

At present, the liquid crystal display panel having a demonstration function is generally classified into a resistance type, a capacitance type, an optical type, an acoustic wave type, and an electro-magnetic type of liquid crystal display panel, in which the resistance type of liquid crystal display panel and the capacitance type of liquid crystal display panel are most commonly used. Taken the resistance type of liquid crystal display panel as an example, the existing liquid crystal display panel having a demonstration function comprises an array substrate and a color filter substrate. The array substrate includes a plurality of scanning lines, a plurality of data lines, a plurality of sub-pixel units and a plurality of touch units, in which the plurality of sub-pixel units form a single pixel unit. Each sub-pixel unit comprises a thin-film transistor and a pixel electrode. The color filter substrate is provided above the array substrate. The color filter substrate includes a plurality of supporting and partitioning members provided between the array substrate and the color filter substrate, a touch protrusion and a common electrode. The common electrode covers the supporting and partitioning members and the touch protrusion. When the demonstration function of the liquid crystal display panel is used, a user touches the liquid crystal display panel and thus the common electrode covering the touch protrusion contacts the corresponding touch unit, so that a voltage applied to the touch unit is changed. X and y coordinates of a touch point are calculated by reading a touch signal using a touch signal transmission wire. The corresponding pixel electrode is applied with a voltage according to the calculated x and y coordinates. After the pixel electrode corresponding to the touch point is applied with the voltage, a potential difference is generated between the pixel electrode and the common electrode, so that liquid crystal molecules between the touch point and the corresponding pixel electrode are deflected. Thus, the amount of the light beam emitted from a backlight source of the liquid crystal display panel and passing through the touch point varies. The liquid crystal display panel calculates the coordinates of the touch points one by one according to the sensed touch track, and changes the voltage applied to the pixel electrode on the array substrate according to the coordinates of the touch points, thereby dynamically forming depicted graphs.

Therefore, it is necessary for the liquid crystal display panel of the prior art to calculate the coordinates of the touch points, to apply a voltage to a corresponding pixel electrode according to the coordinates of the touch points and to deflect the liquid crystal molecules according to the potential difference between the pixel electrode and the common electrode, thereby displaying dynamically depicted graphs. With such liquid crystal display panel, a process for displaying dynamically depicted graphs is complex. In a case where assembling of the liquid crystal display panel is inaccurate, it is likely to cause inaccurate display of the depicted graphs

SUMMARY OF THE INVENTION

In order to overcome the above mentioned and other technical problems in the prior art, embodiments of the present invention provide a liquid crystal display panel. With such liquid crystal display panel, a process for displaying dynamically depicted graphs is simplified, and even if the liquid crystal display panel is not very accurately assembled, inaccurate display of the depicted graphs will not occur.

According to embodiments of an aspect of the present invention, there is provided a liquid crystal display panel comprising an array substrate and a color filter substrate. Liquid crystal is filled between the array substrate and the color filter substrate. The array substrate includes a pixel electrode, and the color filter substrate includes a common electrode corresponding to the pixel electrode. The common electrode stores charges when an external object carrying static electricity touches a display region of the liquid crystal display panel, and thus a potential difference is formed between the pixel electrode of the array substrate and respective touch points, contacting with the external object, in the display region of the liquid crystal display panel, so that the liquid crystal between the touch point and the pixel electrode is deflected according to the formed potential difference.

DETAILED DESCRIPTION OF EMBODIMENTS

Figure 1:
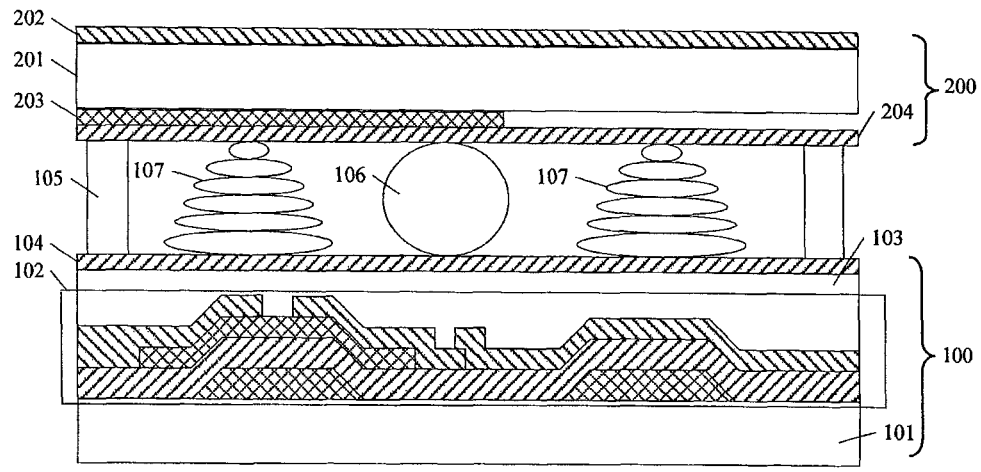
FIG. 1 is a schematic view, in cross-section, of a liquid crystal display panel according to an embodiment of the present invention.

Exemplary embodiments of the present disclosure will be described hereinafter in detail with reference to the attached drawings, wherein the like reference numerals refer to the like elements. The present disclosure may, however, be embodied in many different forms and should not be construed as being limited to the embodiment set forth herein; rather, these embodiments are provided so that the present disclosure will be thorough and complete, and will fully convey the concept of the disclosure to those skilled in the art.

In the following detailed description, for purposes of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

Further, it should be noted that the term "A is provided/formed on B" used herein means that A is spatially provided above B and contacts B, and the term "A is provided/formed beneath B" used herein means that A is spatially provided under B and contacts B, i.e., "B is provided/formed on A". The above terms used herein are defined and used only for the purpose of facilitating description.

With reference to the Figs., according to an embodiment of the present, there is provided a liquid crystal display panel comprising an array substrate and a color filter substrate. Liquid crystal is filled between the array substrate and the color filter substrate. The array substrate includes a pixel electrode, and the color filter substrate includes a common electrode corresponding to the pixel electrode. The common electrode stores charges when an external object carrying static electricity touches a display region of the liquid crystal display panel, and thus a potential difference is formed between the pixel electrode of the array substrate and touch points, contacting with the external object, in the display region of the liquid crystal display panel, so that the liquid crystal between the touch point and the pixel electrode is deflected according the formed potential difference.

With the liquid crystal display panel according to an embodiment of the present invention, when it is used as a demonstration board, the common electrode is not electrically connected with a power supply. By means of a potential difference between the external object carrying static electricity (e.g., a user's fingers or a touch pen carrying static electricity) and the pixel electrode of the array substrate, liquid crystal molecules at the touch point are deflected. In this way, it is not necessary for the liquid crystal display panel to calculate the coordinates of the touch points, so that the process of displaying dynamically depicted graphs is simplified. Furthermore, since it is not necessary to calculate the coordinates of the touch points, even if the array substrate and the color filter substrate are not very accurately assembled, dynamically depicted graphs can be accurately displayed according to the potential difference between the touch point and the corresponding pixel electrode.

Specifically, with reference to FIG. 1, a liquid crystal display panel according to a specific embodiment of the present invention is shown. The liquid crystal display panel comprises an array substrate 100 and a color filter substrate 200. The array substrate 100 includes a TFT thin-film field effect transistor 102 formed on a substrate 101, a protection layer 103 covering the TFT thin-film field effect transistor 102 and a first orientation film 104 covering the protection layer 103. The array substrate further comprises a plurality of scanning lines, a plurality of data lines, a plurality of sub-pixel units and a plurality of touch units. The plurality of sub-pixel units form a single pixel unit (not shown in the Figs.). A gate of the thin-film transistor in each sub-pixel unit is electrically connected with one of the scanning lines, a source of the thin-film transistor in each sub-pixel unit is electrically connected with one of the data lines, and the pixel electrode is electrically connected with a drain of the thin-film transistor in each sub-pixel unit. The color filter substrate 200 includes a common electrode 202 formed on a substrate 201 and a common electrode switch (not shown) for controlling the electrical connection and disconnection of the common electrode with the power supply, black matrixes 203 formed beneath the substrate 201 and a second orientation film 204 formed beneath the black matrixes 203. That is, the black matrixes 203 are formed on the second orientation film 204 and the substrate 201 is formed on the black matrixes. In a preferred embodiment, the liquid crystal display panel further comprises an enclosing glue 105 formed on the first orientation film 104, and supporting and partitioning members 106 formed on the first orientation film. Liquid crystal 107 is filled between the first orientation film 104 and the second orientation film 204.

When the liquid crystal display panel is used as a demonstration board to display dynamically depicted graphs, the common electrode switch is switched off, and a potential difference is formed between the pixel electrode of the array substrate and the respective touch points, contacting with the external object carrying static electricity (e.g., the user's fingers carrying static electricity or touch pens carrying static electricity), in the display region of the liquid crystal display panel by touching the surface of the display region with the external object. The liquid crystal between the touch point and the corresponding pixel electrode is deflected according to the potential difference, so that the liquid crystal display panel displays dynamically depicted graphs. When the liquid crystal display panel is used for removing the depicted graphs or for displaying images, the common electrode switch is switched on. When the common electrode switch is switched on, there is no potential difference between the common electrode and the pixel electrode, and the liquid crystal is not deflected, so that the graphs depicted on the liquid crystal display panel can be removed.

Figure 2:
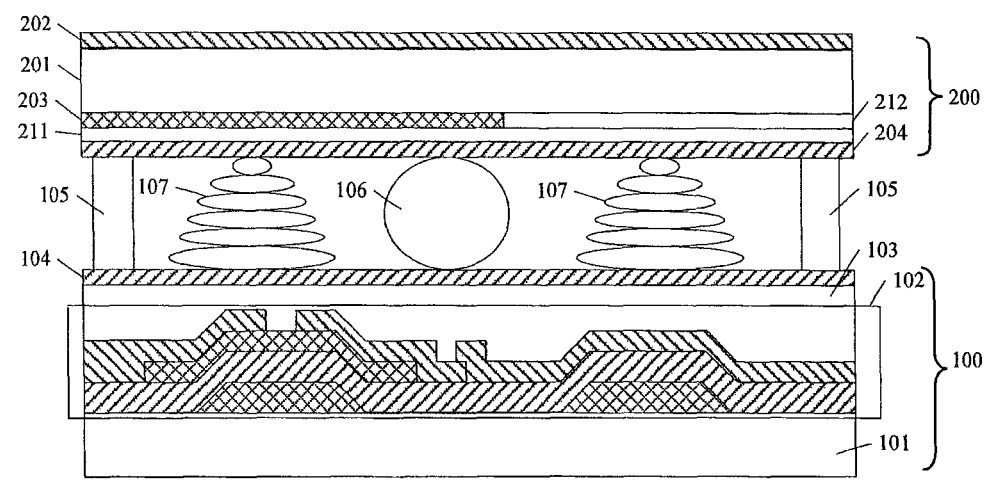
FIG. 2 is a schematic view, in cross-section, of a liquid crystal display panel, having an ITO layer and a transparent resin layer, according to an embodiment of the present invention.

In a preferred embodiment, in a case where the liquid crystal display panel only has a demonstration function, the color filters in the color filter substrate can be omitted so as to improve a light transmittance of the liquid crystal display panel. As shown in FIG. 2, the color filter substrate further comprises an indium tin oxide (ITO) layer 211 and a transparent resin layer 212. The second orientation film 204 is covered with the indium tin oxide (ITO) layer 211. The black matrixes 203 are formed on the ITO layer 211. The transparent resin 212 is filled between two adjacent black matrixes. The substrate 201 is provided on the black matrixes 203 and the transparent resin 212. The common electrode 202 is formed on the substrate 201.

In the color filter substrate, when the common electrode switch provided on the color filter substrate is switched on, there is no potential difference between a voltage applied to the common electrode and a voltage applied to the pixel electrode on the array substrate, and thus the liquid crystal is not deflected any more. At this time, however, a little of static electricity may remain in the liquid crystal. As a result, the liquid crystal may be slightly deflected, and an initialization effect of the liquid crystal display panel may be adversely affected. In a case where the ITO layer is added, the ITO layer can lead all static electricity out of the liquid crystal, so that the initialization effect of the array substrate can be improved. The transparent resin is filled between adjacent black matrixes in the color filter substrate, so that the surface of the layer in which the black matrixes are located can be flattened. Moreover, since the transparent resin has a property of light transmission, its influence on the light transmittance of the liquid crystal display panel can be neglected.

In a preferred embodiment, the liquid crystal display panel according to the embodiment of the present invention controls turn-on or turn-off of the common electrode corresponding to the whole display region by using a single common electrode switch. In an alternative embodiment, the display region of the liquid crystal display panel is divided into at least two sub-regions, each of which corresponds to one common electrode switch used for controlling the common electrode in this sub-region. One sub-region displays dynamically depicted graphs by switching off the common electrode switch for this sub-region, and the dynamically depicted graphs displayed in this sub-region are removed by switching on the common electrode switch for this sub-region. In another alternative embodiment, the display region of the liquid crystal display panel is divided into at least two sub-regions, each of which corresponds to one common electrode switch used for controlling the common electrode in this sub-region. The liquid crystal display panel further comprises a main common electrode switch used for controlling turn-on or turn-off of the common electrode corresponding to the whole display region. One sub-region displays dynamically depicted graphs by switching off the common electrode switch for this sub-region, and the dynamically depicted graphs displayed in this sub-region are removed by switching on the common electrode switch for this sub-region. Furthermore, the depicted graphs displayed in the whole display region are removed by switching on the main common electrode switch, and the whole display region works as a demonstration board by switching off the main common electrode switch.

Figure 3:
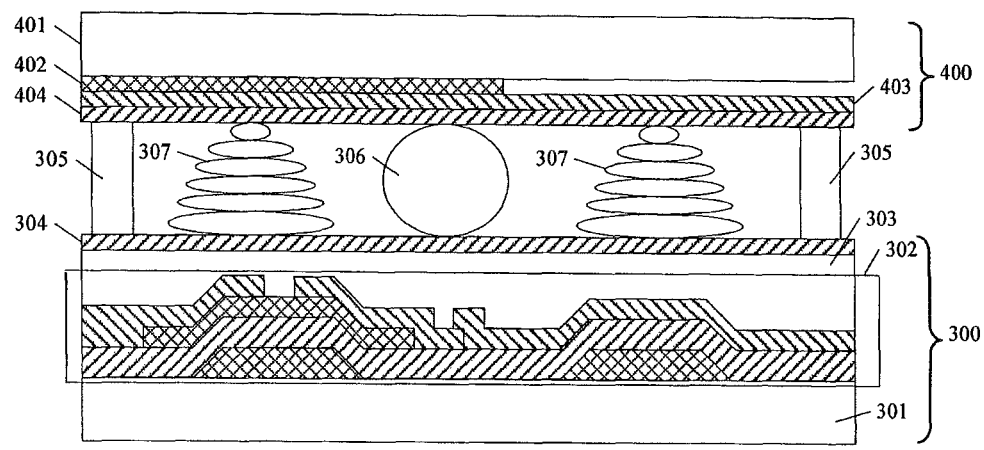
FIG. 3 is a schematic view, in cross-section, of another liquid crystal display panel according to an embodiment of the present invention.

With reference to FIG. 3, a liquid crystal display panel according to another specific embodiment of the present invention is shown. The liquid crystal display panel comprises an array substrate 300 and a color filter substrate 400. Liquid crystal is filled between the array substrate 300 and the color filter substrate 400. The array substrate 300 includes a TFT thin-film field effect transistor 302 formed on a first substrate 301, a protection layer 303 covering the TFT thin-film field effect transistor 302 and a first orientation film 304 covering the protection layer 103. The array substrate further comprises a plurality of scanning lines, a plurality of data lines, a plurality of sub-pixel units and a plurality of touch units. The plurality of sub-pixel units form a single pixel unit (not shown in the Figs.). A gate of the thin-film transistor in each sub-pixel unit is electrically connected with one of the scanning lines, a source of the thin-film transistor in each sub-pixel unit is electrically connected with one of the data lines, and the pixel electrode is electrically connected with a drain of the thin-film transistor in each sub-pixel unit. The color filter substrate 400 includes black matrixes 402 formed beneath a substrate 401, a common electrode 403 formed beneath the black matrixes 402 and a common electrode switch (not shown) for controlling turn-on and turn-off of the common electrode, and a second orientation film 404 formed beneath the common electrode 403 and the common electrode switch. In other words, the common electrode 403 and the common electrode switch are formed on the second orientation film 404, the black matrixes 402 are formed on the common electrode 403 and the common electrode switch, and the substrate 401 is formed on the black matrixes 402. In a preferred embodiment, the liquid crystal display panel further comprises an enclosing glue 305 formed on the first orientation film 304, and supporting and partitioning members 306 formed on the first orientation film. The liquid crystal 107 is filled between the first orientation film 304 and the second orientation film 404.

When the liquid crystal display panel is used as a demonstration board to display dynamically depicted graphs, the common electrode switch is switched off, and a potential difference is formed between the pixel electrode of the array substrate and the respective touch points, contacting with the external object carrying static electricity (e.g., the user's fingers or touch pens carrying static electricity), in the display region of the liquid crystal display panel by touching the surface of the display region with the external object. The liquid crystal between the touch point and the corresponding pixel electrode is deflected according to the potential difference, so that the liquid crystal display panel displays dynamically depicted graphs. When the liquid crystal display panel is used for removing the depicted graphs or for displaying images, the common electrode switch is switched on. When the common electrode switch is switched on, there is no potential difference between the common electrode and the pixel electrode, and the liquid crystal is not deflected, so that the graphs depicted on the liquid crystal display panel can be removed.

Figure 4:
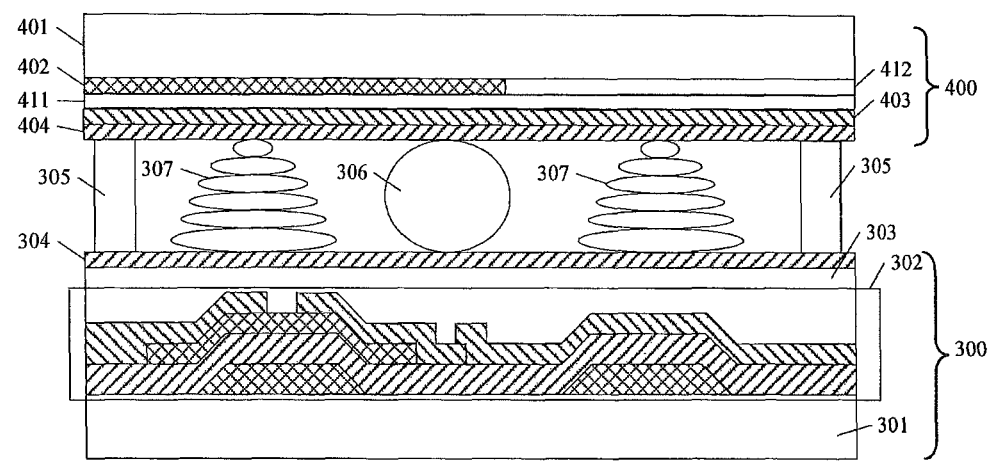
FIG. 4 is a schematic view, in cross-section, of another liquid crystal display panel, having an ITO layer and a transparent resin layer, according to an embodiment of the present invention.

In a preferred embodiment, in a case where the liquid crystal display panel only has a demonstration function, the color filters in the color filter substrate can be omitted so as to improve a light transmittance of the liquid crystal display panel. As shown in FIG. 4, the array substrate further comprises an indium tin oxide (ITO) layer 411 and a transparent resin layer 412. The second orientation film 404 is covered with the common electrode 403. The common electrode 403 is covered with the ITO layer 411. The black matrixes 402 are formed on the ITO layer 411. The transparent resin 412 is filled between two adjacent black matrixes. The substrate 401 is provided on the black matrixes 402 and the transparent resin 412.

In the color filter substrate, when the common electrode switch provided on the color filter substrate is switched on, there is no potential difference between a voltage applied to the common electrode and a voltage applied to the pixel electrode on the array substrate, and thus the liquid crystal is not deflected any more. At this time, however, a little of static electricity may remain in the liquid crystal. As a result, the liquid crystal may be slightly deflected, and an initialization effect of the liquid crystal display panel may be adversely affected. In a case where the ITO layer is added, the ITO layer can lead all static electricity out of the liquid crystal, so that the initialization effect of the array substrate can be improved. The transparent resin is filled between adjacent black matrixes in the color filter substrate, so that the surface of the layer in which the black matrixes are located can be flattened. Moreover, since the transparent resin has a property of light transmission, its influence on the light transmittance of the liquid crystal display panel can be neglected.

In a preferred embodiment, the liquid crystal display panel according to the embodiment of the present invention controls turn-on or turn-off of the common electrode corresponding to the whole display region by using a single common electrode switch. In an alternative embodiment, the display region of the liquid crystal display panel is divided into at least two sub-regions, each of which corresponds to one common electrode switch used for controlling the common electrode in this sub-region. One sub-region displays dynamically depicted graphs by switching off the common electrode switch for this sub-region, and the dynamically depicted graphs displayed in this sub-region are removed by switching on the common electrode switch for this sub-region. In another alternative embodiment, the display region of the liquid crystal display panel is divided into at least two sub-regions, each of which corresponds to one common electrode switch used for controlling the common electrode in this sub-region. The liquid crystal display panel further comprises a main common electrode switch used for controlling turn-on or turn-off of the common electrode corresponding to the whole display region. One sub-region displays dynamically depicted graphs by switching off the common electrode switch for this sub-region, and the dynamically depicted graphs displayed in this sub-region are removed by switching on the common electrode switch for this sub-region. Furthermore, the depicted graphs displayed in the whole display region are removed by switching on the main common electrode switch, and the whole display region works as a demonstration board by switching off the main common electrode switch.

Figure 5:
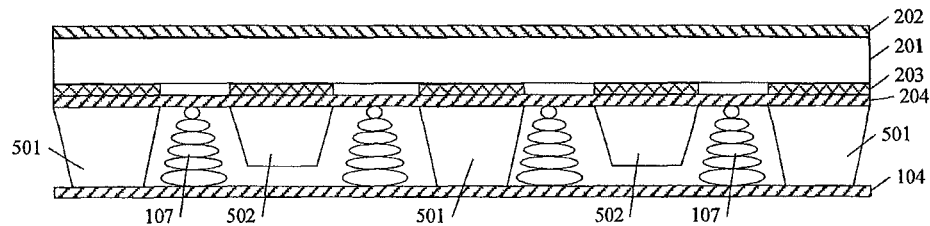
FIG. 5 is a schematic view of supporting and partitioning members in the liquid crystal display panel according to embodiments of the present invention.

In a preferred embodiment, as shown in FIG. 5, the supporting and partitioning members in the liquid crystal display panel according to the embodiments of the present invention comprise two types of supporting and partitioning members. Taken the liquid crystal display panel of FIG. 1 as an example, one type of supporting and partitioning members 501 contact the first orientation film 104 and the second orientation film 204 and are used for supporting the second orientation film 204, the black matrixes 203 formed on the second orientation film and the substrate 201 formed on the black matrixes 203. The other type of supporting and partitioning members 502 contact the second orientation film 204 and are used for contacting the first orientation film 104 so as to support the second orientation film 204, the black matrixes 203 formed on the second orientation film and the substrate 201 provided on the black matrixes 203, when the substrate is subjected to an external pressure to be deformed.

Figure 6:
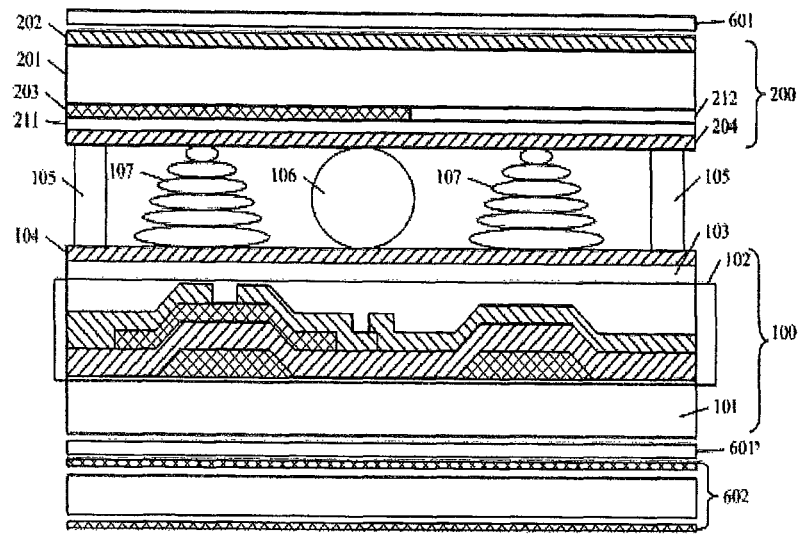
FIG. 6 is a schematic view, in cross-section, of the liquid crystal display panel of FIG. 2, in which a polarizer and a backlight module are provided.
Figure 7:
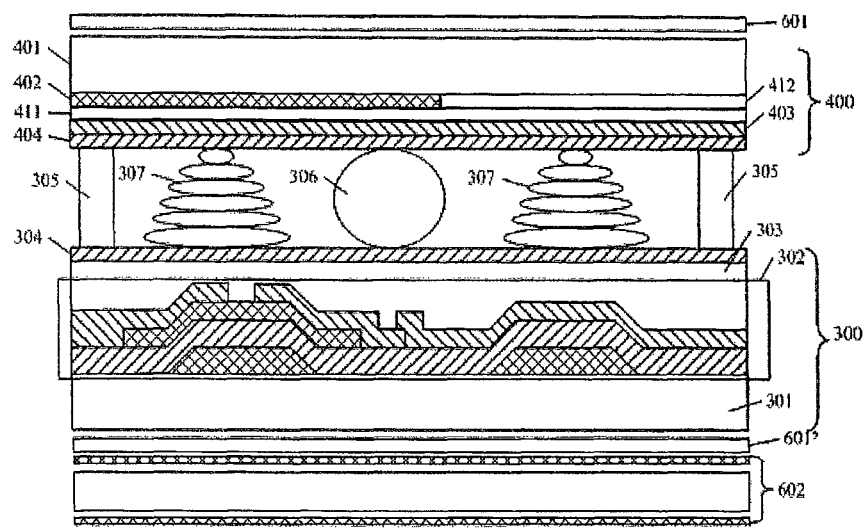
FIG. 7 is a schematic view, in cross-section, of the liquid crystal display panel of FIG. 4, in which a polarizer and a backlight module are provided.

In an embodiment, as shown in FIGS. 6 and 7, the liquid crystal display panel further comprises a first polarizer 601 provided on the color filter substrate 200, a second polarizer 601' provided beneath the array substrate 100 and a backlight module 602 provided beneath the second polarizer. A light emitted from the backlight module 602 is filtered by the second polarizer provided on a bottom surface of the array substrate and then is vertically incident into the array substrate. When the liquid crystal in the liquid crystal display is deflected, the light is refracted and then enters the color filter substrate, and finally passes through the first polarizer provided on the color filter substrate.

The above described embodiments are only used to explain the concept of invention of the present invention, and should not be regarded as a limit to the present invention. It would be appreciated by those skilled in the art that various changes and substitutions may be made without departing from the principle and spirit of the disclosure. Such changes and substitutions fall into the scope of the disclosure.

What is claimed is:

1. A liquid crystal display panel, comprising an array substrate and a color filter substrate, in which liquid crystal is filled between the array substrate and the color filter substrate, the array substrate includes a pixel electrode, and the color filter substrate includes a common electrode corresponding to the pixel electrode, wherein:
the common electrode stores charges when an external object carrying static electricity touches a display region of the liquid crystal display panel, and thus a potential difference is formed between the pixel electrode of the array substrate and respective touch points, contacting with the external object, in the display region of the liquid crystal display panel, so that the liquid crystal between the touch point and the pixel electrode is deflected according to the formed potential difference,
wherein the color filter substrate further comprises at least one common electrode switch for controlling electrical connection and disconnection of the common electrode with a power supply,
wherein when the common electrode switch is switched off, the liquid crystal display panel is used as a demonstration board which is capable of displaying dynamically depicted graphs; when the common electrode switch is switched on, there is no potential difference between the common electrode and the pixel electrode, and the liquid crystal filled between the common electrode and the pixel electrode is not deflected, so that the graphs dynamically depicted on the liquid crystal display panel are removed or the liquid crystal display panel is used for displaying images.

2. The liquid crystal display panel according to claim 1, wherein the at least one common electrode switch comprises one common electrode switch used for controlling turn-on or turn-off of the common electrode corresponding to the whole display region.

3. The liquid crystal display panel according to claim 1, wherein the display region of the liquid crystal display panel is divided into at least two sub-regions, and the at least one common electrode switch comprises at least two common electrode switches, and each sub-region corresponds to one common electrode switch used for controlling turn-on or turn-off of the common electrode corresponding to the respective sub-regions.

4. The liquid crystal display panel according to claim 3, wherein the at least one common electrode switch comprises one common electrode switch used for controlling, as a whole, turn-on or turn-off of the common electrode corresponding to the whole display region.

5. The liquid crystal display panel according to claim 1, wherein the color filter substrate further comprises:
a substrate on which the common electrode and the at least one common electrode switches are provided;
black matrixes provided beneath the substrate; and
an orientation film provided beneath the black matrixes.

6. The liquid crystal display panel according to claim 5, wherein the color filter substrate further comprises:
an indium tin oxide layer formed between the black matrix and the orientation film; and
a transparent resin formed among the black matrixes and configured to flatten a surface of a layer in which the black matrixes are located.

7. The liquid crystal display panel according to claim 6, wherein the liquid crystal display panel further comprises:
a first polarizer provided on the color filter substrate;
a second polarizer provided beneath the array substrate; and
a backlight module provided beneath the second polarizer.

8. The liquid crystal display panel according to claim wherein the color filter substrate further comprises:
a substrate;
black matrixes provided beneath the substrate; and
an orientation film provided beneath the black matrixes;
wherein the common electrode and the at least one common electrode switches are provided between the black matrix and the orientation film.

9. The liquid crystal display panel according to claim 8, wherein the color filter substrate further comprises:
an indium tin oxide layer formed between the black matrixes and the common electrode; and
a transparent resin formed among the black matrixes and configured to flatten a surface of a layer in which the black matrixes are located.

10. The liquid crystal display panel according to claim 9, wherein the liquid crystal display panel further comprises:
- a first polarizer provided on the color filter substrate;
- a second polarizer provided beneath the array substrate; and
- a backlight module provided beneath the second polarizer.

11. The liquid crystal display panel according to claim 1, wherein the liquid crystal display panel further comprises supporting and partitioning members provided between the array substrate and the color filter substrate and provided on the orientation film of the color filter substrate, the supporting and partitioning members being configured to partition the liquid crystal.

* * * * *